F. J. ROBINSON.
POSITIVE FRICTION CLUTCH.
APPLICATION FILED SEPT. 3, 1913.
1,151,616.     Patented Aug. 31, 1915.
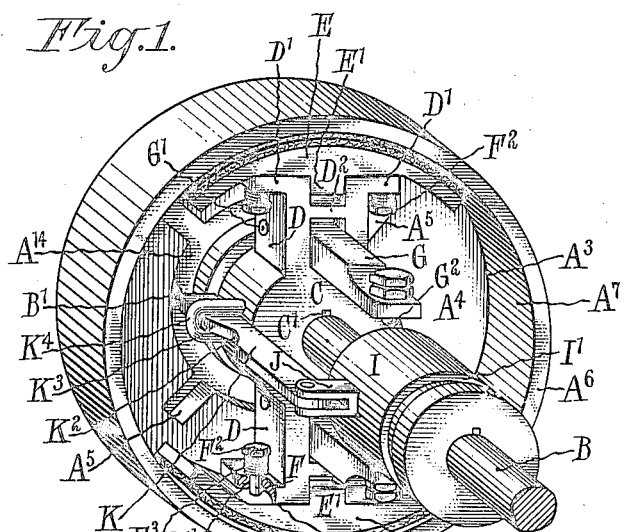
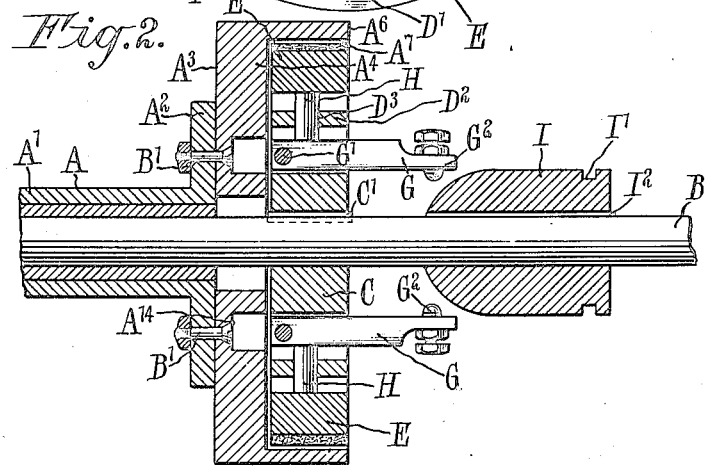
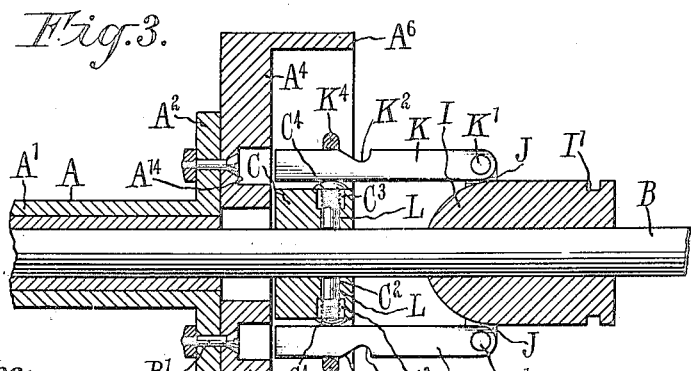
Witnesses:
Harry J. Fleischer
F. George Barry
Inventor:
Francis J. Robinson
by his attorneys
Brown Seward

UNITED STATES PATENT OFFICE.

FRANCIS JOSEPH ROBINSON, OF RICHMOND HILL, ONTARIO, CANADA.

POSITIVE FRICTION-CLUTCH.

1,151,616.  Specification of Letters Patent.  Patented Aug. 31, 1915.

Application filed September 3, 1913. Serial No. 787,883.

*To all whom it may concern:*

Be it known that I, FRANCIS JOSEPH ROBINSON, a subject of the Crown of Great Britain, and resident of Richmond Hill, in the county of York, in the Province of Ontario, Canada, have invented new and useful Improvements in Positive Friction-Clutches, of which the following is a specification.

My invention relates to improvements in positive friction clutches and the object of the invention is to provide a simple form of clutch which may be initially drawn into frictional engagement so that the driving and driven mechanisms rotate together before the positive portion of the clutch is thrown into engagement, and it consists essentially of a member rotatably mounted on a shaft having an annular friction rim, of a stationary member secured on a shaft, arms extending from such member carrying friction shoes designed to be thrown into engagement with the internal periphery of the friction rim, a movable cone member mounted on the shaft, levers carried by the stationary clutch member and co-acting with the movable cone to throw the shoes into engagement with the rim, an annular face groove formed in the movable clutch member concentric with the shaft and having radial offsets, pivoted arms carried by the cone member, the end of the arms being designed to normally enter the annular grooves when the friction shoes are drawn into engagement with the rim and means for forcing such arms out into the offset portions of the groove when brought opposite the same as hereinafter more particularly explained by the following specification.

In the accompanying drawings, Figure 1 is a perspective view of my clutch, Fig. 2 is a longitudinal section, Fig. 3 is a plan section.

In the drawings like letters of reference indicate corresponding parts in each figure.

A is a driving member of the clutch comprising a sleeve A′ having a flange portion A².

A³ is a movable friction member comprising the annular disk portion A⁴ in which is located an annular groove A¹⁴ concentric with the center of the shaft B on which the driving member is mounted. The groove A¹⁴ is provided with radial offset portions A⁵ for a purpose which will hereinafter appear. The member A³ is provided with an annular flange A⁶ having an internal friction periphery A⁷. The portion A³ is connected to the portion A² by suitable bolts B′.

C is a stationary member of the clutch secured by a key C′ to the shaft B. The member C is provided with radial arms D located diametrically opposite each other. The outer ends of the arms D are provided with right angular offset portions D′ and are connected together intermediately of their height by a bridge portion D² having a central orifice D³.

E are the friction shoes provided with a central lug E′ fitting between the arms D.

F are bolts extending loosely through the orifice F′ formed in the right angular portions D′ of the arms D, the inner end of the portions being secured in the shoes E. The bolts F are provided with suitable heads F² between which and the right angular portion D′ extends a spiral compression spring F³.

G are levers pivoted between the arms D on a pivot bolt G′.

G² is an adjustable bearing screw extending through the free ends of the arms.

H is a pin held in the orifice D³ and bearing at one end against the shoe E and at its opposite end against the lever G.

I is a cone member provided with an annular groove I′ which a suitable operating lever engages. The cone member I is connected with the shaft B by a feather key I².

J are bearing lugs extending through the cone member at diametrically opposite points.

K are arms pivoted to the lugs J by pins K′.

K² is a notch formed in each of the arms K and provided with an inclined portion K³.

K⁴ is a staple pin extending from the stationary member C over the arms K.

L is a pin loosely held in the orifice C² formed in the stationary member C. The orifice C² is provided with an enlargement C³ and C⁴ is a compression spring extending between the bottom of such enlargement and the head of the pin L.

Having described the principal parts involved in my invention, I will briefly describe the operation of the same. When it is desired to throw on the clutch connecting the driving member A with the shaft B the cone member I is moved by a suitable lever, not shown, over the shaft B and between the diametrically opposite ends of the bearing screws $G^2$. By this means the levers G are carried outwardly at their free ends, carrying the pin H upwardly against the shoes which are thereby carried into contact with the internal periphery $A^7$ of the rim $A^6$. Simultaneously, the inner ends of the arms K are carried into the annular groove $A^{14}$. If any slipping occurs between the friction shoes and the rim $A^6$ the end of the arms K are of course carried circumferentially around the groove $A^{14}$ until they are brought opposite the radial offsets $A^5$ extending therefrom. It will, of course, be understood that as the arms K are carried by the cone member I into the groove $A^{14}$ the notch $K^2$ is brought opposite a suitable pin $K^4$. The spring pressed pins L bearing against the arms K then act to force the free ends of the arms outwardly against the outer periphery of the groove $A^{14}$ so that when such arms are brought opposite the offsets they fly radially outwardly into such offsets making a positive connection between the driving member A and the stationary member C. Of course, when opening the clutch the reverse operation takes place. The inclined faces $K^3$ of the notches $K^2$ contacting with the staple bolts $K^4$ thereby gradually withdrawing the further ends of the arms K from the offsets as the cone member I is moved in the reverse direction. Simultaneously, as soon as the main member is withdrawn from between the bearing pins $G^2$, the springs $F^3$ serve to withdraw the friction shoes E away from the peripery of the rim $A^6$.

It will be seen from this description that I have provided a very simple form of clutch which may be thrown into positive engagement without jarring or racking the clutch as the moving parts come into engagement with the stationary parts, thereby greatly increasing the life of a clutch and dispensing with all noise or chatter.

What I claim is:—

1. In a positive friction clutch, the combination with the shaft of a driving member mounted thereon having a friction rim extending therefrom and a face groove concentric with the center of the shaft and having radial offsets, a driven member secured to the shaft, shoes carried thereby, operating means for carrying the shoes into engagement with the rim, and means carried by such operating means designed to simultaneously enter the groove and to be brought into engagement with the offsets when brought opposite such offsets by the sliding shoes of the rim, as and for the purpose specified.

2. In a positive friction clutch, the combination with the shaft, of a driving member mounted thereon having a friction rim and an annular face groove concentric with the center of the shaft and having radial offsets, a driven member secured to the shaft, a cone member slidably held upon the shaft, positive engaging members carried by the cone member and slidably connected to the driven member, friction shoes carried by the driven member, and means operated by the slidable cone for simultaneously carrying the friction shoes into engagement with the rim and the free ends of such positive engaging members into the groove, and means for forcing such free ends outwardly into the radial grooves of the offsets when brought opposite the same, as and for the purpose specified.

3. In a positive friction clutch, the combination with the shaft, of a driving member loosely mounted thereon, having a friction rim and an annular face groove concentric with the center of the shaft and having radial offsets, a driven member secured to the shaft, a cone operating member suitably mounted on the shaft, arms pivotally carried by such cone member and having notches therein, straddling retaining members extending from the driven member over such arms, and means for forcing such arms outwardly when the notches are brought opposite the straddling means and the free ends of the arms are brought opposite the groove offsets, radial arms extending from the driven member, friction shoes carried thereby, means operated by the cone member for carrying the friction shoes into engagement with the rim, and means for automatically withdrawing the shoes from the rim when the shoe operating means is released, as and for the purpose specified.

In testimony, that I claim the foregoing as my invention, I have signed my name in presence of two witnesses, this 23rd day of August 1913.

FRANCIS JOSEPH ROBINSON.

Witnesses:
   D. S. TOVELL,
   L. G. LANGSTAFF.